(12) United States Patent
Ooshita

(10) Patent No.: US 9,630,696 B2
(45) Date of Patent: Apr. 25, 2017

(54) OUTBOARD MOTOR SHIFT ACTUATOR

(71) Applicant: NHK SPRING CO., LTD., Yokohama-shi, Kanagawa (JP)

(72) Inventor: Sachio Ooshita, Yokohama (JP)

(73) Assignee: NHK SPRING CO., LTD., Yokohama-Shi, Kanagawa (JP)

( * ) Notice: Subject to any disclaimer, the term of this patent is extended or adjusted under 35 U.S.C. 154(b) by 0 days.

(21) Appl. No.: 15/086,021

(22) Filed: Mar. 30, 2016

(65) Prior Publication Data

US 2016/0288892 A1 Oct. 6, 2016

(30) Foreign Application Priority Data

Apr. 3, 2015 (JP) .................. 2015-077104

(51) Int. Cl.
*B63H 20/20* (2006.01)
*B63H 20/14* (2006.01)
*F16H 25/20* (2006.01)

(52) U.S. Cl.
CPC ............. *B63H 20/14* (2013.01); *B63H 20/20* (2013.01); *F16H 25/2015* (2013.01); *F16H 2025/204* (2013.01); *F16H 2025/2081* (2013.01)

(58) Field of Classification Search
CPC .... B63H 20/14; B63H 20/20; F16H 2025/204
See application file for complete search history.

(56) References Cited

U.S. PATENT DOCUMENTS

| 6,835,109 B2 | 12/2004 | Takada et al. | |
| 9,017,118 B1* | 4/2015 | Pfiffner et al. | B63H 20/14 |
| | | | 440/75 |
| 2016/0137280 A1* | 5/2016 | Sugiyama et al. | B63H 23/30 |
| | | | 440/75 |

FOREIGN PATENT DOCUMENTS

JP 2004001638 A 1/2004

\* cited by examiner

*Primary Examiner* — Andrew Polay
(74) *Attorney, Agent, or Firm* — Holtz, Holtz & Volek PC

(57) ABSTRACT

According to one embodiment, a shift actuator includes a main body section and a shaft section. The main body section has an electric motor which has a vertically extending rotating shaft, and a gear mechanism which rotates the shaft section in accordance with the rotating shaft. The shaft section has a threaded shaft extending parallel to the rotating shaft and made to rotate by the gear mechanism in accordance with the rotating shaft and a movable nut which is screwed onto the threaded shaft and moves upward or downward with rotation of the threaded shaft. The movable nut is connected with a shift member which changes the gears of a propeller shaft.

5 Claims, 6 Drawing Sheets

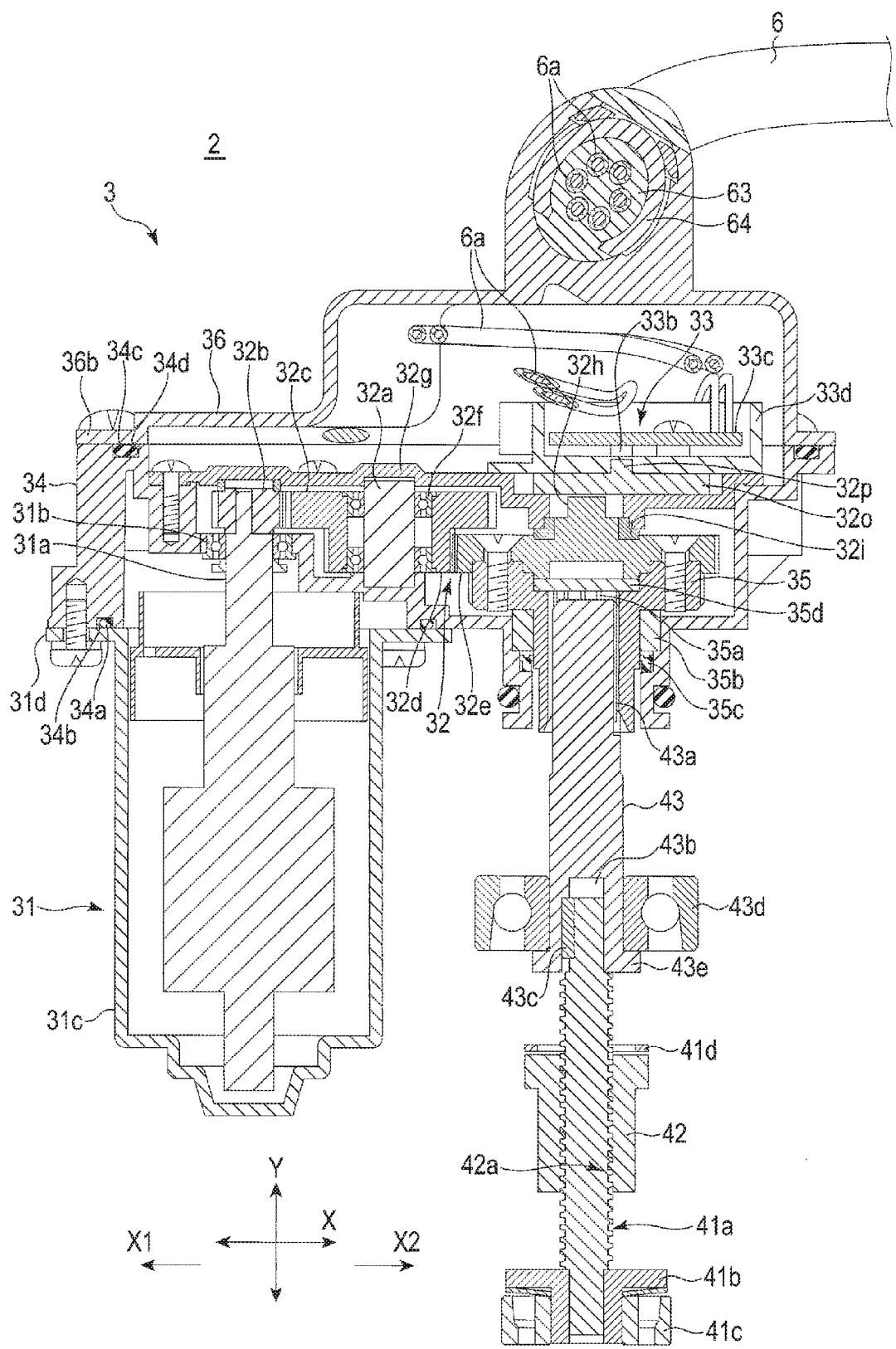
F I G. 3

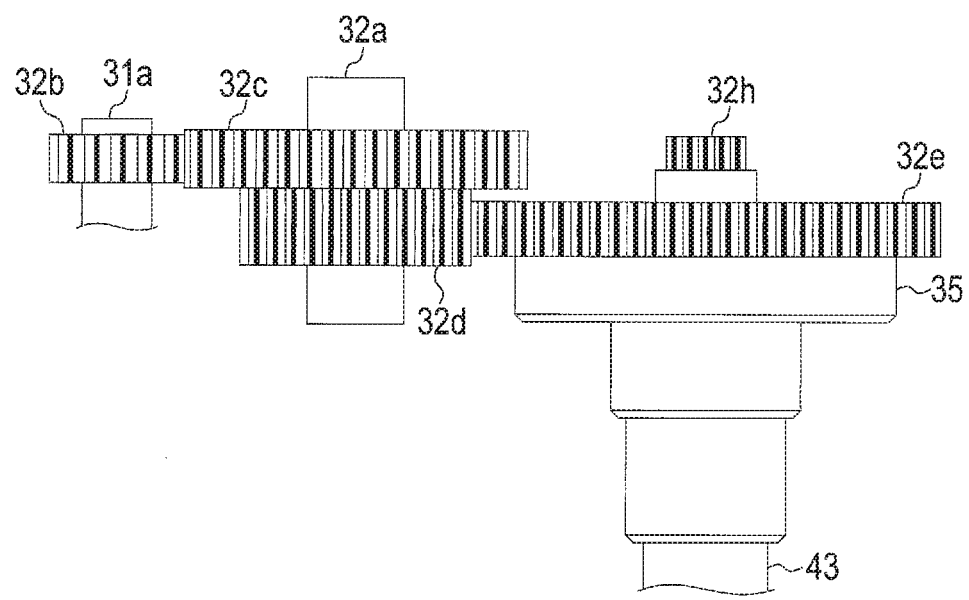
F I G. 6
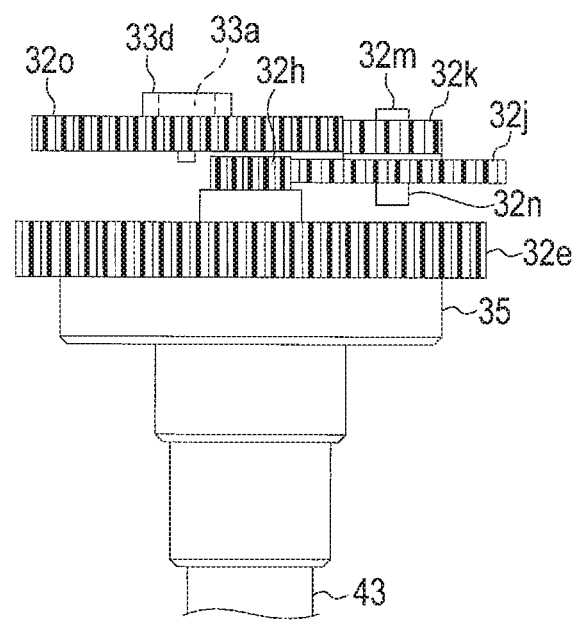
F I G. 7

OUTBOARD MOTOR SHIFT ACTUATOR

CROSS-REFERENCE TO RELATED APPLICATIONS

This application is based upon and claims the benefit of priority from prior Japanese Patent Application No. 2015-077104, filed Apr. 3, 2015, the entire contents of which are incorporated herein by reference.

BACKGROUND OF THE INVENTION

1. Field of the invention

The present invention relates to a shift actuator which helps perform electrical gear change of a propeller shaft for an outboard motor mounted on a vessel.

2. Description of the Related Art

There are known various kinds of shift actuators, each being included in an outboard motor and electrically actuating a gearshift for a propeller shaft. For example, there is a shift actuator which causes an electric motor to rotate a shift rod and activates replacement of gears between an ahead gear and an astern gear.

In such a shift actuator, an electric motor rotates a shift rod. The rotation of the shift rod is changed into a rectilinear motion which moves coaxially with a propeller shaft. The rectilinear motion is transmitted to a shift slider. The shift slider slides along the propeller shaft. As the shift slider slides, it moves a dog clutch which has three positions, one being an ahead position, another a neutral position, and the third an astern position. The dog clutch is made to move to one of the three positions by the shift slider, and, when the dog clutch is brought to either the ahead position or the astern position, it is suitably joined to either one of the ahead gear and astern gear which are provided in the propeller shaft, thereby accomplishing a change of gears. In this way, shifting a gear using an electric motor will improve a gear change response, resulting in achievement of a quick gear change.

It should be noted that an electric motor that rotates a shift rod should be arranged near a shift slider or a dog clutch (in short, a propeller shaft) to make the shift rod slide the shift slider. This is because not only reduction in the overall length of a shift rod will be achieved but also it will be easy to promote transmission efficiency of motor power, improvement in transmission accuracy of motor power, and miniaturization of a shift actuator. Therefore, the shift actuator which includes the electric motor is arranged in the gearshift case which is located in a lower part (lower unit) which the outboard motor has.

However, the shift slider in the shift actuator must axially slide along the propeller shaft in order to move the dog clutch. Therefore, a movable region (space) which extends along the propeller shaft should be secured in the gearshift case.

It should be noted here that a gearshift case generally contains many accommodation parts inside of it. Therefore, there is a possibility that a sufficiently large movable region, which extends along a propeller shaft, cannot be secured in a shift actuator. Moreover, a shift actuator becomes long along a propeller shaft by the length of a movable region. Therefore, there is a possibility that miniaturization of a shift actuator cannot be sufficiently achieved.

BRIEF SUMMARY OF THE INVENTION

According to an aspect of embodiments, a shift actuator inside an outboard motor comprises a main body section which is accommodated in a gearshift case and a shaft section which is provided in the gearshift case and fitted in the main body section. The main body section comprises an electric motor and a gear mechanism. The electric motor has a rotating shaft which extends vertically and perpendicularly to a propeller shaft. The gear mechanism connects the rotating shaft of the electric motor with the shaft section of the shift actuator and causes the rotating shaft of the electric motor to rotate the shaft section of the shift actuator. The shaft section has a threaded shaft and a movable nut. The threaded shaft extends parallel to the rotating shaft of the electric motor. The threaded shaft rotates in conjunction with the rotating shaft of the electric motor, because of the gear mechanism. The movable nut is screwed on the threaded shaft. The movable nut moves upward or downward with rotation of the threaded shaft. The movable nut is connected with a shift member which changes the gears of the propeller shaft.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a sectional view of the shift actuator taken along F3-F3 line in FIG. 2.

FIG. 6 is a schematic diagram illustrating a gear mechanism which causes the rotating shaft of the electric motor to rotate the shaft section.

FIG. 7 is a schematic diagram illustrating a gear mechanism which causes the shaft section to rotate a detection target section of a sensor.

DETAILED DESCRIPTION OF THE INVENTION

Hereafter, a shift actuator in one embodiment used for an outboard motor will be explained with reference to FIG. 1 to FIG. 7.

Figure 1:
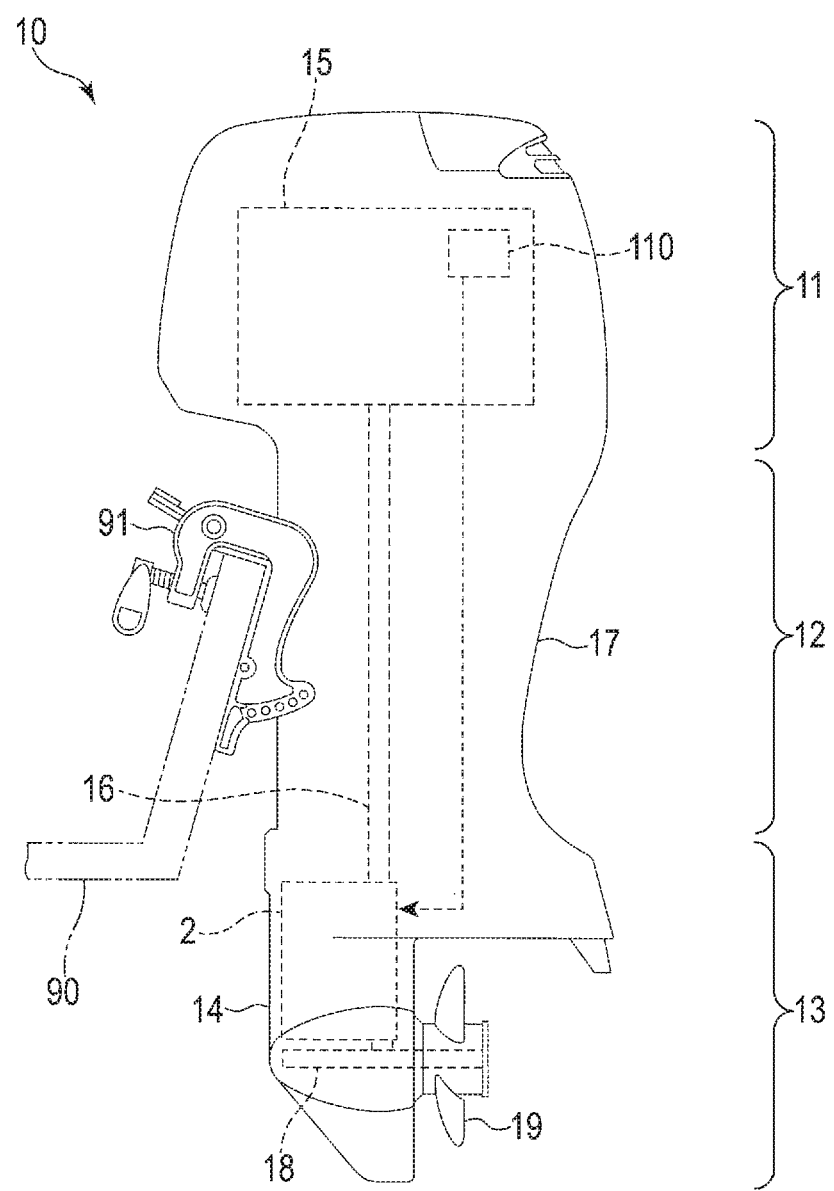
FIG. 1 is a schematic diagram illustrating the structure of an outboard motor having a shift actuator in one embodiment of the present invention.
Figure 1:
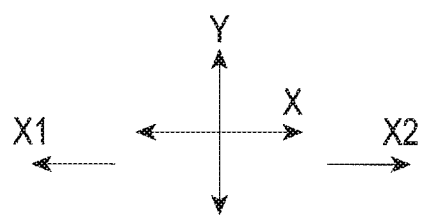

A shift actuator in the embodiment is put in an outboard motor, which is installed in a vessel and rotates a propeller shaft. The shift actuator performs gear change (shift) for the propeller shaft. FIG. 1 illustrates an exemplary outboard motor 10 which has a shift actuator 2 in the embodiment. It should be noted here that, in the following explanation, an arrow X in each of FIG. 1 to FIG. 3 indicates both forwardness and backwardness, whereas an arrow Y in each of FIG. 1 to FIG. 3 indicates both upwardness and downwardness. Specifically, an arrow X1 denotes forwardness (front), an arrow X2 backwardness (back).

As illustrated in FIG. 1, the outboard motor 10 comprises an engine unit 11, a mid unit 12 having a front part, and a lower unit 13, all units being arranged in the mentioned order from top to bottom of the outboard motor 10 and constituting a single body. The outboard motor 10 has a bracket 91 at the front part of the mid unit 12. A vessel has a hull and a rear plate 90 at the hull. The bracket 91 is fixed to the rear plate 90. The shift actuator 2 is in the lower unit 13. Specifically, it is in a gearshift case 14 which the lower unit 13 has. When the outboard motor 10 is an operation, the lower unit 13 including the shift actuator 2 is under the water surface.

The engine unit 11 has an engine 15. A V-type or in-line type multiple cylinder engine may be used as the engine 15. The engine 15 has a vertically extending crankshaft (not illustrated). The crankshaft of the engine 15 has a lower end section which is connected to a drive shaft 16. The drive shaft 16 vertically extends through the mid unit 12. Specifically, the mid unit 12 has a drive shaft housing 17 which accommodates the drive shaft 16. The drive shaft 16 has two ends, one protruding from the drive shaft housing 17 toward the engine unit 11 and the other protruding from the drive shaft housing 17 toward a lower unit 13. The lower unit 13 has a propeller shaft 18 which extends fore and aft. The propeller shaft 18 has a propeller 19. The propeller shaft 18 is rotated by a driving force of the drive shaft 16 transmitted through gears which are accommodated in the gearshift case 14 of the lower unit 13.

Figure 2:
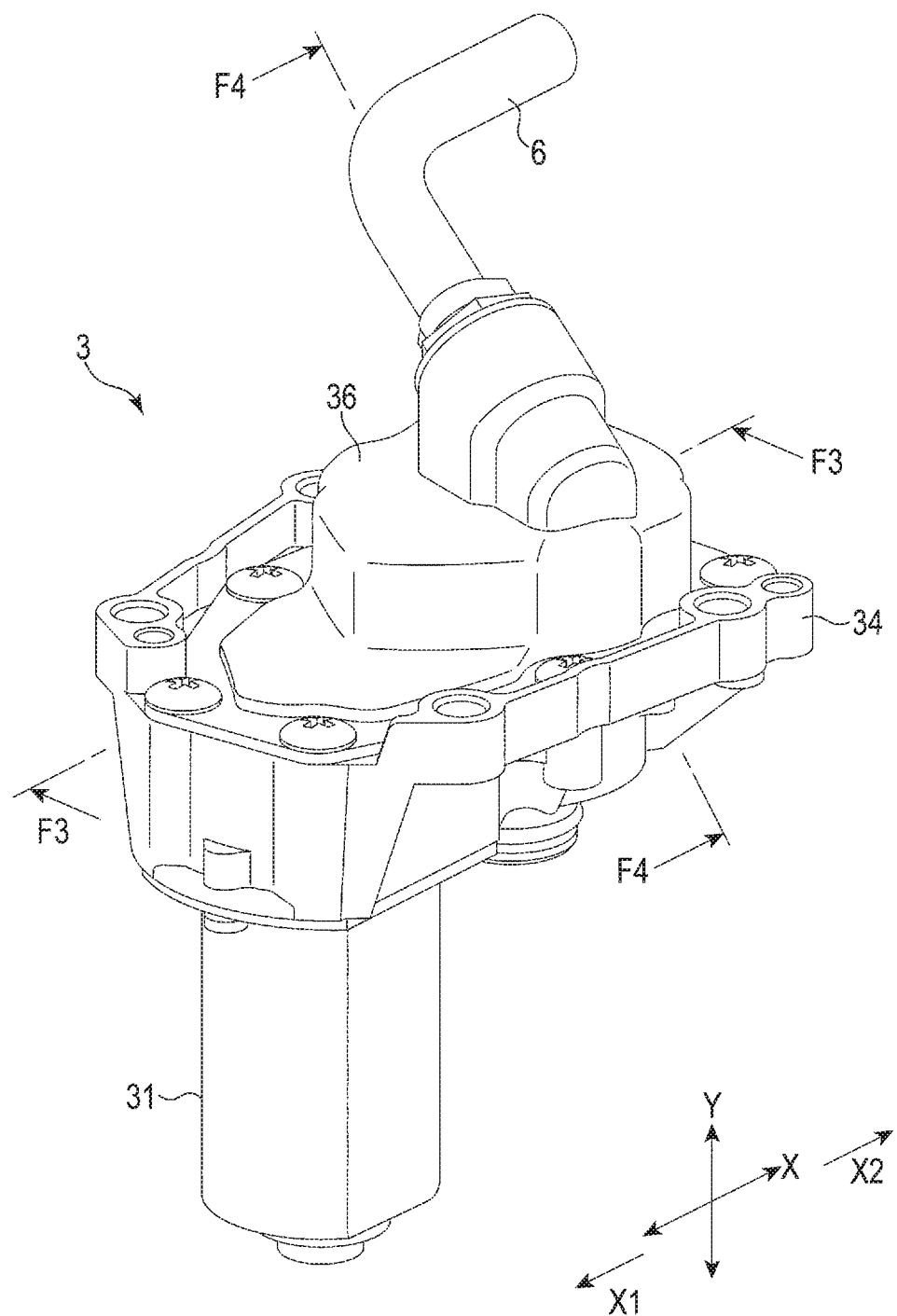
FIG. 2 is a perspective view illustrating the external appearance of the shift actuator in the embodiment of the present invention.
Figure 4:
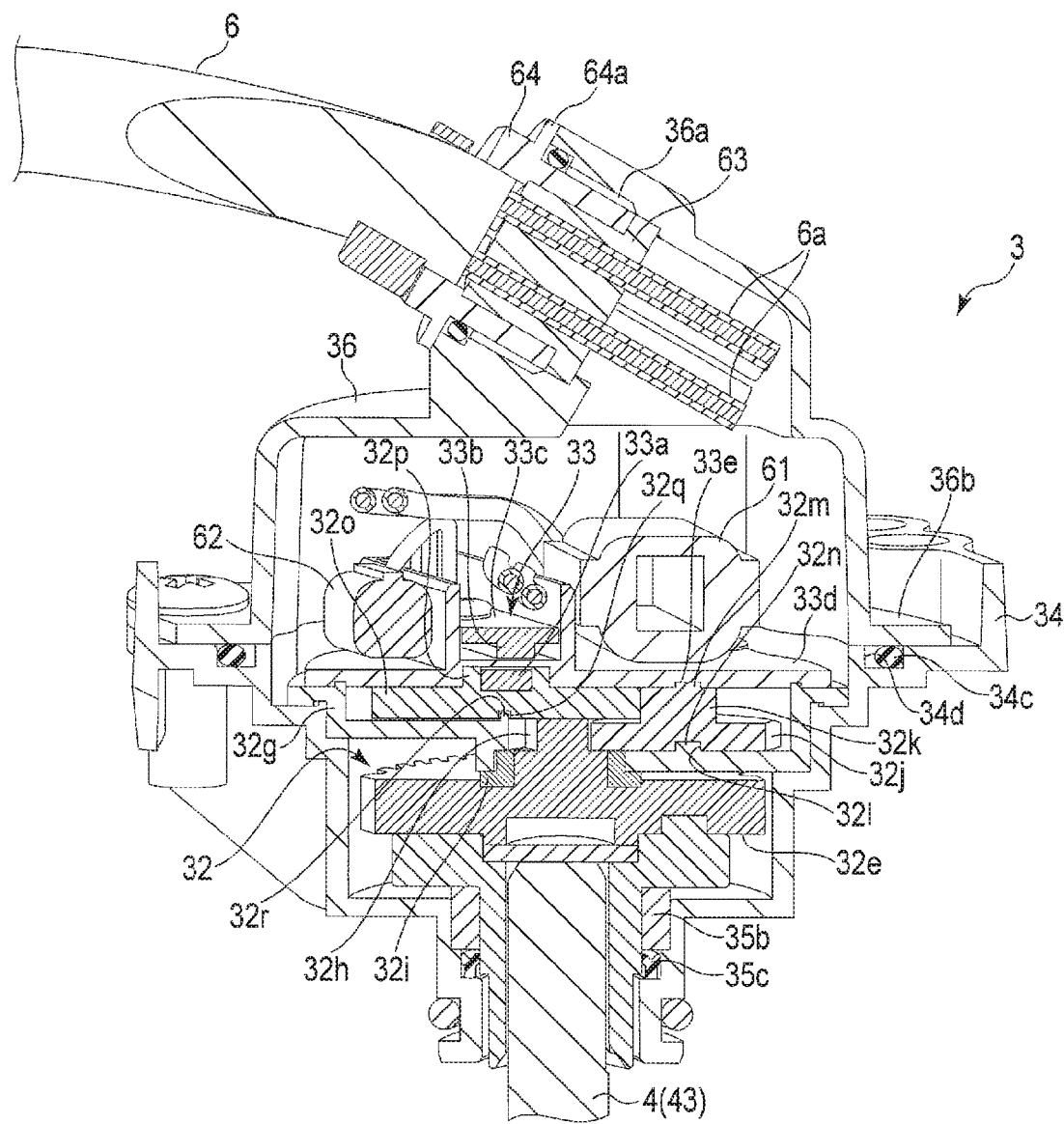
FIG. 4 is a sectional view of the shift actuator taken along F4-F4 line in FIG. 2.

The shift actuator 2 operates under the control of an electronic control unit (ECU) 110 which is in the engine unit 11 and receives remote instructions all the way from a pilothouse. FIG. 2 through FIG. 4 individually illustrate the shift actuator 2 in the embodiment. FIG. 2 is a perspective view illustrating the external appearance of the shift actuator 2. FIG. 3 and FIG. 4 are sectional views each illustrating the shift actuator 2.

The shift actuator 2 has the main body section 3 removably accommodated in the gearshift case 14 of the outboard motor 10, and a shaft section 4 removably combined to the main body section 3. FIG. 2 illustrates only the main body section 3 which is in a state where it is separated from the shaft section 4. FIG. 3 and FIG. 4 individually illustrate a state where the main body section 3 and the shaft section 4 are combined together.

The main body section 3 has a base material 34. The main body section 3 further has on the base material 34 an electric motor 31, a gear mechanism 32, and a sensor 33. The electric motor 31 has a rotating shaft 31a. The electric motor 31 is attached to the base material 34 in such a manner that the rotating shaft 31a extends vertically and perpendicularly to the propeller shaft 18 which extends fore and aft. The base material 34 has a roiling bearing 31b and rotatively supports the rotating shaft 31a with the help of the rolling bearing 31b. The electric motor 31 has a motor yoke 31c. The motor yoke 31c has an upper part and a flange 31d provided at the upper part. The electric motor 31 and the base material 34 are screwed together with an O-ring 34a interposed between the flange 31d and a lower part which the base material 34 has. The O-ring 34a is fitted in a groove 34b formed in the lower part of the base material 34. This arrangement surely waterproofs the connecting part of the electric motor 31 and the base material 34.

The shaft section 4 has a threaded shaft 41, a movable nut 42 which engages with the threaded shaft 41, and a supporting spindle 43 which supports the threaded shaft 41. The shaft section 4 is arranged so that it may extend upward and downward parallel to the rotating shaft 31a of the electric motor 31.

Figure 5:
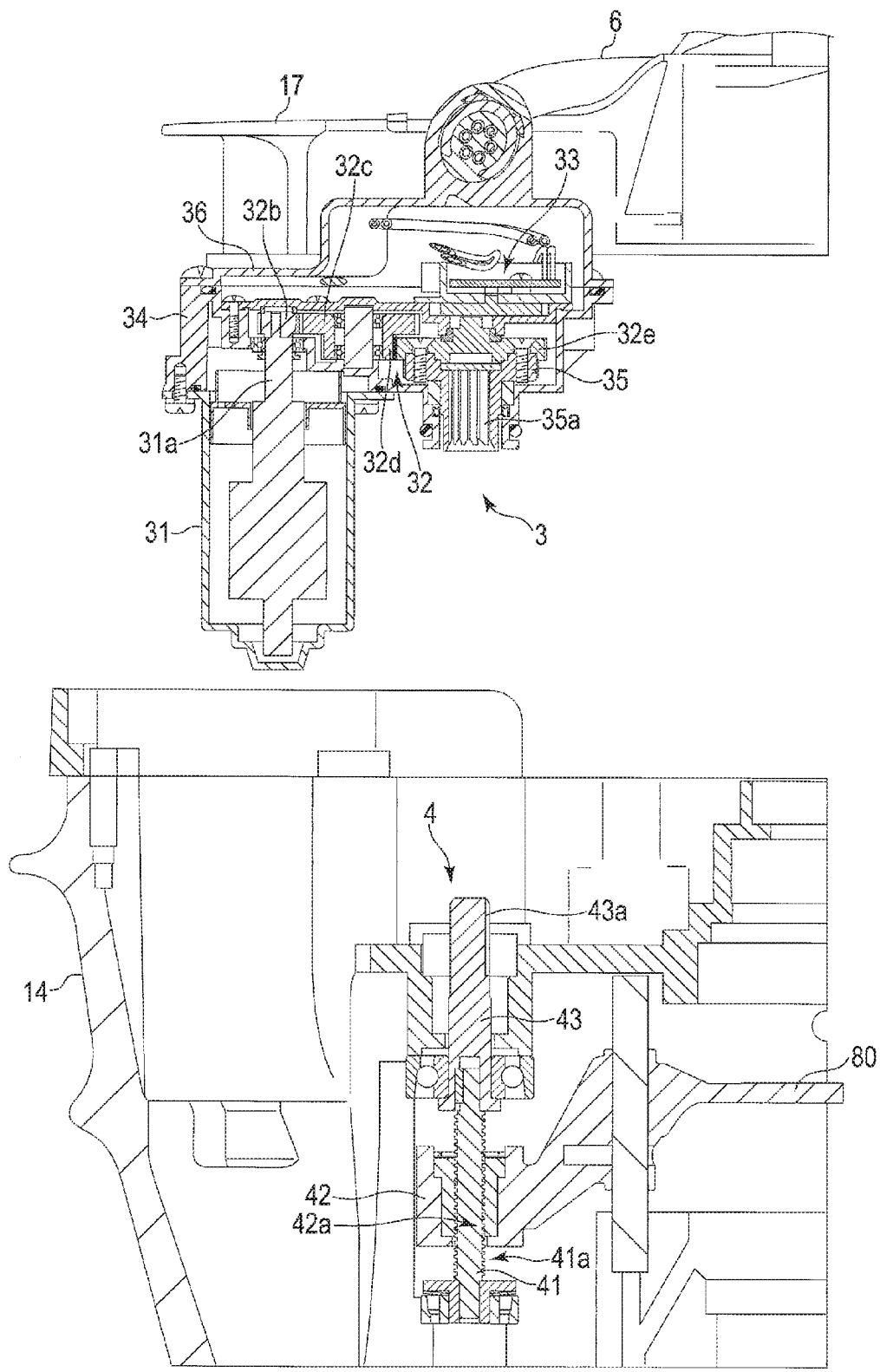
FIG. 5 is a view illustrating the state where the shift actuator is divided into a main body section and a shaft section.

The shaft section 4 and the main body section 3 are detachably combined together in such a manner that the supporting spindle 43 is detachably fitted in the base material 34. FIG. 5 is a view illustrating the state where the main body section 3 and the shaft. section 4 are separated from each other. As illustrated in FIG. 5, the shaft section 4 is provided in the gearshift case 14, and the main body section 3 is provided in the drive shaft housing 17. Therefore, when the main body section 3 is separated from the shaft section 4, the base material 34 is simultaneously separated from the supporting spindle 43. As a result, the shaft section 4 and the gearshift case 14 can be dealt with as one piece, and the main body section 3 and the drive shaft housing 17 can be dealt with as one piece. Therefore, what remains in the gearshift case 14 is the shaft section 4 alone. As a result, a cable 6 which the main body section 3 has does not become obstructive, since it is separated away along with the main body section 3. It will be easy to perform maintenance of the gearshift case 14.

In order to make it possible to separate the shaft section 4 and the main body section 3 in this way, the supporting spindle 43, which has an upper end portion and a periphery of the upper end portion, is provided with axially (vertically) extending spline teeth 43a, which have a predetermined circumferential pitch, on the periphery of the upper end portion. The base material 34 supports a cylindrical receiving member 35 which has a cylinder. The cylinder has an inner circumference. The receiving member 35 has spline grooves 35a, which extend upward and downward, in the inner circumference of the cylinder. The spline grooves 35a have the same circumferential pitch as the spline teeth 43a of the supporting spindle 43. The spline grooves 35a engage with the spline teeth 43a. The cylindrical receiving member 35 has an axis of rotation which extends upward and downward. The base material 34 has a bush (a slide bearing) 35b and rotatively supports the cylindrical receiving member 35 with the bush. The bush 35b is attached to the base material 34 with a piece of packing 35c, which has a lip, intervening between the bush 35b and the base material 34. The cylinder of the cylindrical receiving member 35 has an upper end, to which a piece of packing 35d is attached. This structure surely waterproofs the attachment portion where the bush 35b and the base material 34 are attached to each other, and the engaging portion where the spline grooves 35a and the spline teeth 43a engage with each other.

It should be noted that, in order to easily achieve separation of the shaft section 4 and the main body section 3, spline fitting of the supporting spindle 43 and the base material 34 is employed in the embodiment, but it is possible that the shaft section 4 and the main body section 3 may be inseparable (including a case where separation is possible but difficult). In such a case, the supporting spindle 43 may be rotatively attached to the base material 34 using a rolling bearing. This structure makes it possible to eliminate the cylindrical receiving member 35 and the bush 35b. Accordingly, the number of parts can be reduced.

When the supporting spindle 43 is fitted in the cylindrical receiving member 35 of the base material 34, the shaft section 4 will be rotatively connected through the gear mechanism 32 to the rotating shaft 31a of the electric motor 31. Rotation of the shaft section 4 is thus achieved. How the gear mechanism 32 rotatively connects the shaft section 4 to the rotating shaft 31a and how the gear mechanism 32 causes the rotating shaft 31a to rotate the shaft section 4 will he structurally described later.

The threaded shaft 41 of the shaft section 4 has a peripheral surface, an upper end, and a lower end. The threaded shaft 41 has a spirally extending ball groove 41a on the peripheral surface except for the upper end and the lower end. The threaded shaft 41 has a lower end section and a collar 41b attached to the lower end section. The collar 41b has two ends, one of which has a flange. In the state where the collar 41b is attached to the lower end section, the flange is at an upper side. The collar 41b has an outer circumferential wall. The rolling bearing 41c has an inner race. The inner race of the rolling bearing 41c is attached to the outer circumferential wall of the collar 41b. The rolling bearing 41c further has an outer race which is fitted in the gearshift case 14. It is the rolling bearing 41c that allows the threaded shaft 41 to be rotatively supported by the gearshift case 14.

The threaded shaft 41 has an upper end section. The supporting spindle 43 has a lower end section and a hole 43h formed in the lower end section. The upper end section of the threaded shaft 41 is inserted in the hole 43b with a parallel key 43c interposed between and extending parallel to the upper end section and the hole 43b. This arrangement prevents a slide from occurring between the threaded shaft 41 and the supporting spindle 43, and surely connects the threaded shaft 41 with the supporting spindle 43.

The movable nut 42 of the shaft section 4 has an inner circumference section which has a spirally extending ball groove 42a facing the spirally extending ball groove 41a of the threaded shaft 41. The ball groove 41a and the ball groove 42a face each other to form a spirally extending space in which bails (not illustrated) are put in such a manner that they freely roll and circulate through the spirally extending space. Accordingly, when the threaded shaft 41 rotates, the turning force will be transmitted to the balls, and the balls will circulate through the spiral space. As a result, the movable nut 42 moves upward or downward along the threaded shaft 41 with rotation of the threaded shaft 41. The threaded shaft 41 has a retaining ring 41d which defines an upper movable limit for the movable nut 42. The collar 41b defines a lower movable limit for the movable nut 42. The vertical movement of the movable nut 42 therefore is limited within a narrow range defined by the retaining ring 41d and the color 41b.

The movable nut 42 is connected with a shift member 80 (see FIG. 5) which changes gears of the propeller shaft 18. Accordingly, the shift member 80 moves upward or downward along with the movable nut 42 with rotation of the threaded shaft 41. Since the gear change (shift) of the propeller shaft 18 is performed by upward or downward motion of the shift member 80, it is not necessary to extend forward and backward the movable range of the shift actuator 2, which makes it easy to secure a movable region in the gearshift case 14.

The rolling bearing 43d enables the gearshift case 14 to rotatively support the supporting spindle 43 of the shaft section 4. The supporting spindle 43 has an outer circumferential wall at the lower end section and a flange 43e provided at the outer circumferential wail of the lower end section. The rolling bearing 43d is fixed to the outer circumferential wall of the supporting spindle 43 with the inner race on the flange 43e.

The gear mechanism 32 enables the rotating shaft 31a of the electric motor 31 to rotate the shaft section 4, which comprises the threaded shaft 41 and the supporting spindle 43.

The gear mechanism 32 intervenes between the rotating shaft 31a of the electric motor 31 and the supporting spindle 43 of the shaft section 4. The gear mechanism 32 causes the rotating shaft 31a to rotate the supporting spindle 43. The gear mechanism 32 has, as a shaft to relay rotation of the rotating shaft 31a, an idler shaft 32a between the rotating shaft 31a of the electric motor 31 and the supporting spindle 43 of the shaft section 4. The idler shaft 32a extends vertically parallel to the rotating shaft 31a and the supporting spindle 43 of the shaft section 4.

FIG. 6 is a schematic diagram illustrating the gear mechanism 32 which causes the rotating shaft 31a to rotate the supporting spindle 43. As illustrated in FIG. 6, it is the engagement of spur gears that enables the rotating shaft 31a to rotate the idler shaft 32a, and the idler shaft 32a to rotate the supporting spindle 43 fitted in the cylindrical receiving member 35. The rotating shaft 31a supports a motor shaft gear 32b. The supporting spindle 43 has the cylindrical receiving member 35 which supports a shift gear 32e. The idler shaft 32a supports a first idler gear 32c and a second idler gear 32d. Among these gears, the motor shaft gear 32b and the first idler gear 32c engage with each other, and the second idler gear 32d and the shift gear 32e engage with each other.

As illustrated in FIG. 3, the rotating shaft 31a of the electric motor 31 has a tip portion (or an upper end portion) and a whirl-stop which has a D-shaped cross-section and is formed at the tip portion. The motor shaft gear 32b has at its center a D-shaped hole which is conformable to the D-shaped cross-section of the whirl-stop formed at the tip portion of the rotating shaft 31a of the electric motor 31. The tip portion of the rotating shaft 31a of the electric motor 31 is fitted in the D-shaped hole of the motor shaft gear 32b.

The idler shaft 32a always stands still and has an upper end and a lower end which is fixed to the base material 34. A rolling bearing 32f has two inner races and is fitted over the idler shaft 32a with each of the two inner races located at a corresponding one of the upper and lower ends of the idler shaft 32a. The rolling bearing 32f has two outer races, each being fitted in a corresponding one of the first idler gear 32c and the second idler gear 32d. The rolling bearing 32f therefore rotatively supports the first idler gear 32c and the second idler gear 32d.

The first idler gear 32c and the second idler gear 32d are supported by the idler shaft 32a in such a manner that the first idler gear 32c is vertically placed on the second idler gear 32d along the idler shaft 32a to form two layers. The first idler gear 32c and the second idler gear 32d rotate in the same direction with centering on the idler shaft 32a. It should be noted that the following structure may be also possible. Namely, a rolling bearing is provided to the base material 34 to enable the base material 34 to rotatively support the idler shaft 32a to which the first idler gear 32c and the second idler gear 32d are fixed.

The shift gear 32e is screwed to the cylindrical receiving member 35 in which the supporting spindle 43 of the shaft section 4 is fitted. This structure makes it possible for the base material 34 to rotatively support the shift gear 32e, since the base material 34 has the bush 35b and rotatively supports with the help of the bush 35b the cylindrical receiving member 35, to which the shift gear 32e is screwed.

The motor shaft gear 32b, the first idler gear 32c, the second idler gear 32d, and the shift gear 32e are inside the base material 34 which has an upper part covered with a gear cap 32g. The gear cap 32g is screwed to the upper part of the base material 34. The motor shaft gear 32b has fewer teeth than the first idler gear 32c. The second idler gear 32d has fewer teeth than the shift gear 32e. In short, the number of teeth decreases in order of the shift gear 32e, the first idler gear 32c, the second idler gear 32d, and the motor shaft gear 32b.

Accordingly, engagement of the motor shaft gear 32b and the first idler gear 32c causes the first idler gear 32c to rotate the idler shaft 32a at a rate lower than that of the rotating shaft 31a. At this moment, the second idler gear 32d rotates with respect to the idler shaft 32a at the same rate as the first idler gear 32c. Accordingly, engagement of the second idler gear 32d and the shift gear 32e causes the shift gear 32e to rotate at a rate lower than that of the second idler gear 32d. Rotation of the shift gear 32e causes the supporting spindle 43 to rotate at the same rate as the shift gear 32e. Accordingly, the threaded shaft 41 connected with the supporting spindle 43 rotates.

The gear mechanism 32 makes it possible for simple spur gears to efficiently reduce the rate of rotation of the rotating shaft 31a of the electric motor 31 and to cause the supporting spindle 43 and the threaded shaft 41, both constituting the shaft section 4, to rotate at the reduced rate. Making the supporting spindle 43 and the threaded shaft 41 rotate at a rate lower than that of the rotating shaft 31a causes their respective torques to increase. This fact allows electrically changing (shifting) gears for the propeller shaft 18. The rate of rotation of the rotating shaft 31a is decelerated in two steps. Each of the gears 32b, 32c, 32d, and 32e can be made small in respect of a diameter dimension. The gear mechanism 32 therefore can be made compact.

The rotating state of the shaft section 4 (the supporting spindle 43 and the threaded shaft 41) is detected by the sensor 33.

The sensor 33 comprises a detection target section 33a which rotates in conjunction with the supporting spindle 43 of the shaft section 4, an element section 33b which detects a rotational position of the detection target section 33a to determine the rotating state of the supporting spindle 43, and a control section 33c which controls the element section 33b. The detection target section 33a is a disk-shaped magnet. Specifically, the detection target section 33a comprises a flat round body which has a circumference and an upper surface constituting a pole face where N poles and S poles are alternately arranged along the circumference of the flat round body. The detection target section 33a is arranged on the detection target section gear 32o, which will be described later. The detection target section 33a and the detection target section gear 32o therefore rotate as one piece. The element section 33b is arranged at the control plate 33c in such a manner that it faces the pole face of the detection target section 33a. The element section 33b detects the change of magnetic field produced by the pole face which rotates with rotation of the detection target section 33a. The control plate 33c is formed in the shape of a flat board, and is screwed to an upper part which a sensor case 33d has. The sensor case 33d is placed over and screwed to the gear cap 32g.

The gear mechanism 32 rotates the detection target section 33a of the sensor 33 along with the supporting spindle 43. FIG. 7 is a schematic diagram illustrating the gear mechanism 32 which comprises spur gears and rotates the detection target section 33a along with the supporting spindle 43.

As illustrated in FIG. 5 and FIG. 7, the supporting spindle 43 is fitted in the cylindrical receiving member 35 which supports a sensor gear 32h. The shift gear 32e has a three tier structure, in which the lowermost tier is fixed to the cylindrical receiving member 35, the middle tier has a bush (a slide bearing) 32i which enables the middle tier to be rotatively supported by the gear cap 32g, and the highest tier has the sensor gear 32h.

The sensor gear 32h engages with a first relay gear 32j. The first relay gear 32j has a two tire structure comprising two tires axially fixed with each other, one of the two tires being a lower tire and constituting the first relay gear 32j itself and the other of the two tires being an upper tire and constituting a second relay gear 32k. The first relay gear 32j and the second relay gear 32k are coaxial with each other. The second relay gear 32k is provided for rotating the detection target section 33a.

The first relay gear 32j has a lower part. The lower part has a cylindrical depression 32l which is coaxial with the first relay gear 32j. The second relay gear 32k has an upper part. The upper part has a cylindrical boss 32m which is coaxial with the second relay gear 32k. The cylindrical depression 32l and the cylindrical boss 32m are coaxial with each other. The gear cap 32g has a cylindrical boss 32n which protrudes upward and can be fitted in the cylindrical depression 32l. The sensor case 33d has a cylindrical depression 33e in which the cylindrical boss 32m can be fitted. The cylindrical boss 32n is a little larger in diameter than the cylindrical depression 32l. The cylindrical boss 32m is a little larger in diameter than the cylindrical depression 33e. These structures not only make it easy to respectively insert the cylindrical boss 32n and the cylindrical boss 32m into the cylindrical depression 32l and the cylindrical depression 33e, but also achieve one piece rotation of the first relay gear 32j and the second relay gear 32k.

The second relay gear 32k engages with the detection target section gear 32o. The detection target section gear 32o comprises a disk which has an upper flat surface and a lower flat surface and is larger in diameter than the detection target section 33a. The detection target section gear 32o has an annular projection 32p on the upper flat surface of the disk. The annular projection 32p is coaxial with the disk. The detection target section 33a is fixed in the projection 32p, and rotates along with the detection target section gear 32o as one piece.

The detection target section gear 32o has in the lower flat surface of the disk a round depression 32q which is coaxial with the disk and the annular projection 32p. The gear cap 32g has a cylindrical boss 32r which projects upward and is fit in the round depression 32g. The cylindrical boss 32r is a little larger in diameter than the round depression 32q and is fit in the round depression 32g. This structure makes it possible to rotate both the detection target section gear 32o and the detection target section 33a as one body.

The sensor gear 32h has fewer teeth than the first relay gear 32j. The second relay gear 32k has fewer teeth than the detection target section gear 32o. In short, the number of teeth decreases in order of the detection target section gear 32o, the first relay gear 32j, the second relay gear 32k, and the sensor gear 32h.

Accordingly, engagement of the sensor gear 32h and the first relay gear 32 causes the first relay gear 32j to rotate at a rate lower than that of the supporting spindle 43. At this moment, the second relay gear 32k rotates at the same rate as the first relay gear 32j. Accordingly, engagement of the second relay gear 32k and the detection target section gear 32o causes the detection target section gear 32o to rotate at a rate lower than that of the second relay gear 32k.

The gear mechanism 32 makes it possible for simple spur gears to efficiently reduce the rate of rotation of the supporting spindle 43 and to cause the detection target section gear 32o and the detection target section 33a to rotate at the reduced rate. Namely, the gear mechanism 32 can substantially reduce the rate of rotation of the rotating shaft 31a, and can rotate the detection target section gear 32o and the detection target section 33*a* at the substantially reduced rate. Making the detection target section 33*a* rotate at a very low rate (about one rotation per one operation of the electric motor 31) enables the element section 33*b* to surely and accurately detect the rotational position of the detection target section 33*a*. Moreover, the rate of rotation of the supporting spindle 43 is reduced in two steps, which makes it possible to reduce the diameter of each of the gears 32*h*, 32*j*, 32*k*, and 32*o*. Thus, the gear mechanism 32 will be compact.

As illustrated in FIG. 3 and FIG. 4, the main body section 3 has a cabtyre case 36 as its upper lid. The cabtyre case 36 has an upper part and an opening 36*a* bulging out or the upper part. A cable (a cabtyre cable, for example) 6 which is connected with a predetermined power unit (a battery, or the like) is externally into the opening 36*a*. The cable 6 internally has leads 6*a*. The leads 6*a* are separately connected through connectors 61 and 62 to the electric motor 31 and the sensor 33, and separately supply electricity to the electric motor 31 and the sensor 33.

The cabtyre case 36 has a lower part and a flange 36*b* provided at the lower part. The cabtyre case 36 is fixed to the base material 34 with an O-ring 34*c* intervening between the flange 36*b* and the base material 34. The O-ring 34*c* is fitted in a groove formed in the upper part of the base material 34. This surely waterproofs a joint area between the cabtyre case 36 and the base material 34.

The cabtyre case 36 has a cable: grommet 63 which is made of resin and is fit in the opening 36*a*. The cable grommet 63 has some passages, each having the same diameter as each of the leads 6*a* of the cable 6. The leads 6*a* are inserted in and extend through the respective passages. The cable grommet 63 is fit in 2*s* and held by a cable gland 64. The cable gland 64 has one end which has a flange 64*a*. The cable gland 64 is fitted in the opening 36*a* with the flange 64*a* touching an end face which the opening 36*a* has An O-ring 65 is between the cable gland 64 and the opening 36*a*. The cable gland 64 and the O-ring 65 surely waterproof an area where the cable 6 is drawn out of the opening 36*a* of the cabtyre case 36. It is possible to apply a body of epoxy resin to that area of the cable 6 that is outside the cable gland 64 and that includes a gap between the cable 6 and the cable gland 64 so as to cover with the body of applied epoxy resin a predetermined region which the cable 6 has outside the cable gland 64. This arrangement further improves a waterproof characteristic of the drawn out portion of the cable 6.

As illustrated in FIG. 1, the shift actuator 2 operates under the control of the electronic control unit (ECU) 110 of the engine unit 11 which remotely receives instructions from the pilothouse. Hereafter, how the shift actuator 2 operates will be explained.

The shift actuator 2 is made to operate. Then, the electric motor 31 begins to rotate the rotating shaft 31*a*, which causes the supporting spindle 43 and the threaded shaft 41 to rotate. For example, when the rotating shaft 31*a* is made to rotate clockwise, the supporting spindle 43 and the threaded shaft 41 will also rotate clockwise, which makes the movable nut 42 move upward along the threaded shaft 41. In contrast, when the rotating shaft 31*a* is made to rotate counterclockwise, the supporting spindle 43 and the threaded shaft 41 will also rotate counterclockwise, which makes the movable nut 42 move downward along the threaded shaft 41.

The movable nut 42 is connected with the shift member 80 which changes the gears of the propeller shaft 18. Therefore, vertical motion of the movable nut 42 changes the gears of the propeller shaft 18. For example, when the movable nut 42 moves upward along a sliding course beyond a specified position (neutral position), the movable nut 42 causes the shift member 80 to move upward, and thus the shift member 80 causes an ahead gear (not illustrated) to be connected to the propeller shaft 18. In contrast, when the movable nut 42 moves downward along the sliding course beyond the specified position, the movable nut 42 causes the shift member 80 to move downward, and thus the shift member 80 causes an astern gear (not illustrated) to be connected to the propeller shaft 18. When the movable nut 42 is in the neutral position, neither the ahead gear nor the astern gear is connected to the propeller shaft 18. Transmission of turning force is cut off.

The sensor 33 detects in which one of the neutral position, the ahead position, and the astern position the shift member 80 is located based on the rotating state of the detection target section 33*a* which rotates in synchronization with the shift member 80.

It should be noted that a dog clutch (not illustrated) is used to select either the ahead gear or the astern gear for connecting the drive shaft 16 to the propeller shaft 18. Namely, a choice between the ahead gear and the astern gear is executed by suitably letting in the dog clutch which is operated by the shift member 80, and the chosen near connects the drive shaft 16 to the propeller shaft 18. When the drive shaft 16 and the propeller shaft 18 are connected through the ahead gear or the astern gear, the power of the drive shaft 16 will be transmitted to the propeller shaft 18 as an ahead thrust or an astern thrust. In this way, the direction which the propeller 19 rotates will change by the operation of the shift actuator 2 which achieves gear change (shift) of the propeller shaft 18. The hull will move ahead or astern.

In the present embodiment, the moving range of the shift member 80 connected with the movable nut 42 is restricted to a vertically extending narrow range. The movable region which the shift actuator 2 requires its movable elements to move either upward or downward and either forwards or backwards (along the propeller shaft 18), if any, will be small. Accordingly, miniaturization of the shift actuator 2 will be promoted.

The shift actuator 2 is small. Thus, the electric motor 31 can be arranged near the shift member 80. The loss of motive power which inevitably occurs while the motive power is transmitted from the electric motor 31 to the shift member 80 will be reduced. Accordingly, the response of the gearshift activated by the electric motor 31 will improve. The transmission efficiency and transmission accuracy of motor power will also improve. Moreover, since transmission loss of motor power is low in comparison with the case where an electric motor is arranged at the engine unit or middle unit of an outboard motor, the power consumption of an electric motor will be low.

In addition, the sensor 33 will be arranged near the shift member 80, which makes it possible for the sensor 33 to accurately detect the position of the shift member 80.

One embodiment of the present invention has been explained above with reference to FIG. 1 to FIG. 7. However, the above embodiment is nothing but an example of the present invention. The present invention is not restricted to the above embodiment. It is obvious to a person skilled in the art that the above embodiment can be changed or modified within a scope of the substance of the present invention. Accordingly, those that have been changed or modified in such a manner also belong to the following claims of the present application.

What is claimed is:

1. A shift actuator inside an outboard motor including a propeller shaft and a gearshift case having gears and a shift member, the shift actuator comprising:
a main body section accommodated in the gearshift case of the outboard motor; and
a shaft section inside the gearshift case joined to the main body section,
the main body section comprising:
an electric motor having a rotating shaft extending vertically and perpendicularly to the propeller shaft; and
a gear mechanism causing the rotating shaft of the electric motor to rotate the shaft section, and
the shaft section comprising:
a threaded shaft extending parallel to the rotating shaft of the electric motor, and made to rotate by the gear mechanism in conjunction with the rotating shaft of the electric motor; and
a movable nut screwed on the threaded shaft to vertically move along the threaded shaft with rotation of the threaded shaft, and connected with the shift member to shift the gears for the propeller shaft.

2. The shift actuator of claim 1, wherein the gear mechanism comprises:
an idler shaft extending parallel to the shaft section and the rotating shaft of the electric motor;
a motor shaft gear supported by the rotating shaft of the electric motor;
a first idler shaft gear and a second idler shaft gear both supported by the idler shaft; and
a shift gear supported by the shaft section,
the first idler shaft gear engaging with the motor shaft gear,
the second idler shaft gear engaging with the shift gear,
the motor shaft gear having fewer teeth than the first idler shaft gear, and
the second idler shaft gear having fewer teeth than the shift gear.

3. The shift actuator of claim 1, wherein
the main body section has a sensor for locating the shift member based on the rotating state of the shaft section,
the sensor has a detection target section rotatable in conjunction with the shaft section, and an element section detecting a rotation state in which the detection target section is brought in, and
the gear mechanism causes the rotating shaft of the electric motor to rotate the shaft section, and causes the shaft section to rotate the detection target section of the sensor.

4. The shift actuator of claim 3, wherein
the gear mechanism comprises:
a sensor gear supported by the shaft section;
the first relay gear and the second relay gear both rotated in conjunction with the shaft section; and
a detection target section gear rotating the detection target section of the sensor,
the sensor gear engaging with the first relay gear,
the detection target section gear engaging with the second relay gear,
the sensor gear having fewer teeth than the first relay gear, and
the second relay gear having fewer teeth than the detection target section gear.

5. The shift actuator of claim 1, wherein
the main body section has a cylindrical receiving member removably receiving the shaft section,
the shaft section has a supporting spindle supporting the threaded shaft and received in the cylindrical receiving member,
the cylindrical receiving member has an inner circumference wall and a spline groove on the inner circumference wall, and
the supporting spindle has an outer circumference wall and a spline tooth on the outer circumference wall engaging with the spline groove on the inner circumference wall of the cylindrical receiving member.

* * * * *